United States Patent [19]

Steckler et al.

[11] 4,228,463

[45] Oct. 14, 1980

[54] SWITCHED AFPC LOOP FILTER WITH OFFSET VOLTAGE CANCELLATION

[75] Inventors: Steven A. Steckler, Clark; Alvin R. Balaban, Lebanon, both of N.J.

[73] Assignee: RCA Corporation, New York, N.Y.

[21] Appl. No.: 39,883

[22] Filed: May 17, 1979

[51] Int. Cl.³ .......................... H04N 5/05; H03B 3/04
[52] U.S. Cl. ...................................... 358/158; 331/20
[58] Field of Search .............. 358/148, 158, 159, 127, 358/188, 181; 331/20, 18, 25

[56] References Cited

U.S. PATENT DOCUMENTS

| | | | |
|---|---|---|---|
| 3,740,489 | 6/1973 | Willis | 358/127 |
| 3,846,584 | 11/1974 | Itoh et al. | 358/158 |
| 3,931,467 | 1/1976 | Kulkens | 358/179 |
| 4,093,963 | 6/1978 | Uchida | 358/158 |
| 4,144,544 | 3/1979 | Fernsler | 358/158 |

*Primary Examiner*—John C. Martin
*Attorney, Agent, or Firm*—Eugene M. Whitacre; William H. Meise; W. Brinton Yorks, Jr.

[57] ABSTRACT

A television horizontal AFPC loop includes a filter, the time constant of which can be switched at the vertical rate for improved operation from standard broadcast signals and from video tape recorders. A transistor switch introduces a voltage offset which perturbs the AFPC filtered oscillator control voltage. The perturbation is reduced by introducing a second offset voltage for reducing the perturbation and improving the synchronization of the oscillator with the synchronizing signals.

12 Claims, 3 Drawing Figures

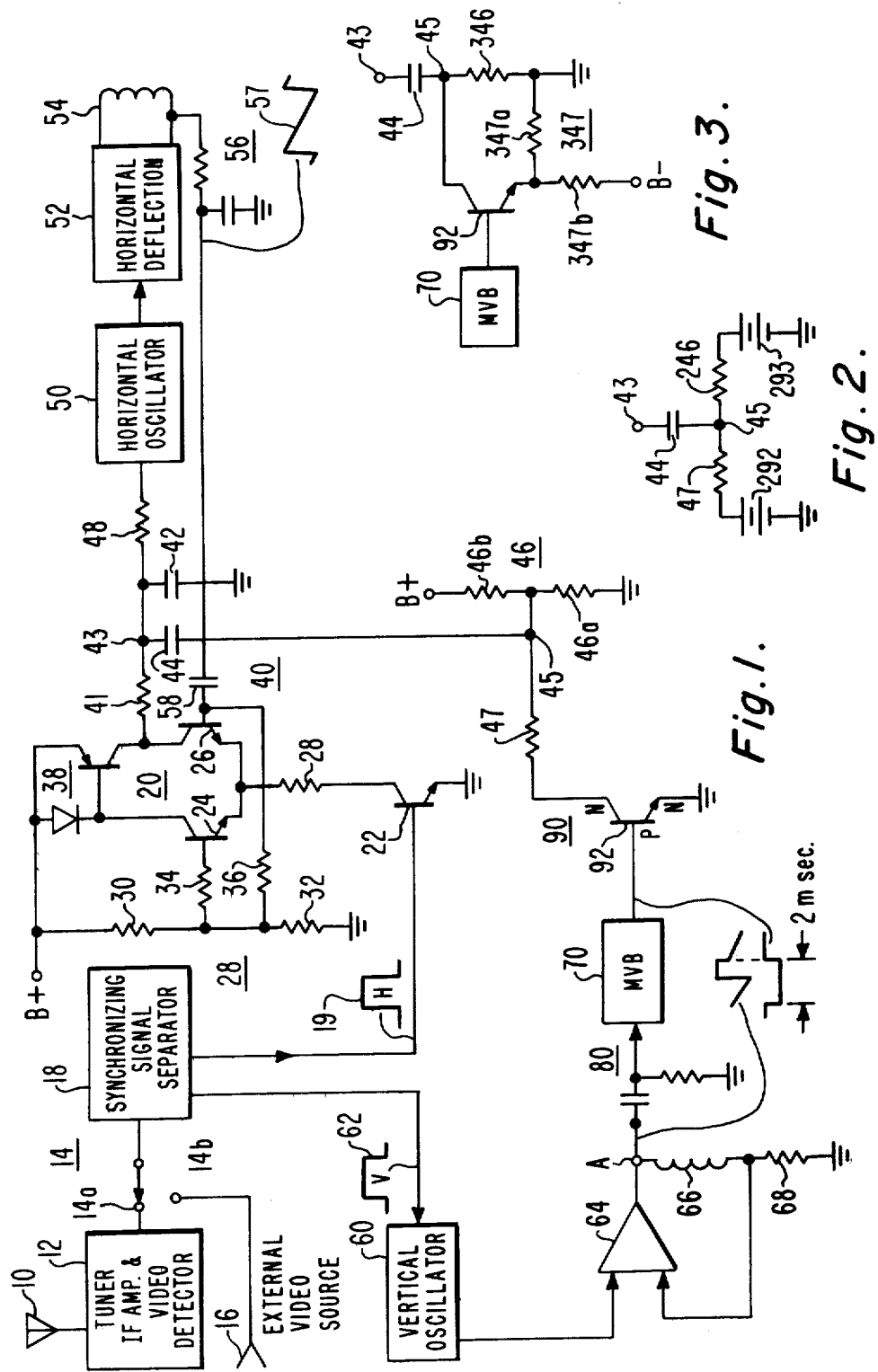

SWITCHED AFPC LOOP FILTER WITH OFFSET VOLTAGE CANCELLATION

BACKGROUND OF THE INVENTION

This invention relates to television horizontal oscillator frequency control (AFPC) arrangements in which the loop filter is switched and in which the switching device creates an offset which perturbs the loop operation.

The raster of a television display is scanned in the vertical and horizontal directions at a rate controlled by vertical and horizontal synchronizing signals, respectively, which are associated with the video to be displayed. Since the composite video may contain noise components, it is customary to provide the television device with noise immunity in the form of a phase-lock loop, in which a controllable horizontal-frequency oscillator is coupled in a feedback loop and a phase-sensitive detector and a low-pass filter, whereby the phase detector produces pulses representative of the difference in phase between the controlled oscillator and the horizontal synchronizing pulses associated with the video. The pulses produced by the phase detector are filtered by the low-pass filter, the output of which is coupled to the control input of the oscillator, and the oscillator rate is thereby maintained equal to the average synchronizing pulse rate.

It will often be desired to supply the television display device with composite video from a video playback device or tape recorder. Such video tape recorders commonly use a plurality of reproduction heads, each of which is mechanically scanned across the tape. In one common scheme, two heads are used, which alternately scan the tape for a duration equal to that of a vertical field. In order to avoid loss of, or breaks in, the displayed information, the succeeding field scanning is commenced by the second head substantially concurrently with the end of scanning in the first head. However, slight differences in tape tension or in the dimensions of the mechanical tape transport acting on the tape during playback compared with the tension and dimensions when the tape was recorded results in differences in the time between succeeding horizontal synchronizing pulses in the information played back as compared with that recorded, especially during the interval in which switchover between the scanning heads occurs. This results in a discontinuity or step in the phase of the horizontal synchronizing pulses available for synchronizing the horizontal oscillator and for controlling the raster. The step in phase normally occurs about five horizontal lines before the end of a vertical scanning interval.

Such a step change of phase will cause the phase-lock loop to control the horizontal oscillator in such a manner as to cause the oscillator phase to change and accommodate itself to the altered phase of the synchronizing signals. However, the gain characteristics of the low-pass filter of the phase-lock loop normally prevents the controlled oscillator from changing at a rate great enough to provide total synchronization between the controlled oscillator and the synchronizing signals before the end of the vertical blanking interval. This may result in a distortion of the displayed video.

U.S. Pat. No. 3,740,489 issued June 19, 1973 in the name of D. Willis describes an external switch by which the user may change the characteristics of the low-pass filter in the phase-lock loop when it is desired to use a tape recorder as the video source. This alters the gain characteristics of the phase-lock loop, allowing the oscillator to change phase or to slew towards the new phase at a greater rate. However, the user may forget to throw the switch, thereby permitting the aforementioned video distortion, or may forget to return the switch to its normal condition when receiving transmitted or broadcast signals, which will make the television receiver horizontal synchronization more sensitive to noise.

It is also known from U.S. Pat. No. 3,846,584, issued on Nov. 9, 1974 in the name of Itoh, et al., to completely disconnect the low-pass filter from the phase-lock loop for a predetermined limited period of time by the use of a switch. U.S. Pat. No. 4,144,544 issued Mar. 13, 1979 to Fernsler illustrates the use of the collector-emitter path for a bipolar transistor as the switching device. It is also known from U.S. Pat. No. 4,093,963 issued June 6, 1978 to Uchida to use a pair of complementary bipolar transistors connected in an antiparalleled fashion as the switching device.

A bipolar transistor when used to switch bidirectional currents will have unequal voltage drops for the two directions of conduction. The problem is not solved by antiparalleling of the transistors, since the base drive is unidirectional, the transistors in general will not have matching characteristics and because of the asymmetrical duty cycle. Consequently, during the ON time of the transistor switch, there is a net rectification of the bidirectional current produced by the phase detector and applied to the switched filter. This rectified signal produces a charge on the filter capacitors which is not dependent upon the relative phase of the horizontal oscillator and the horizontal synchronizing signals, but which depends instead upon the ratio of the ON to the OFF time of the switch. Thus, each transition from ON to OFF of the switching transistor which changes the time constant of the AFPC loop filter introduces a transient voltage to which the filter capacitors respond and which causes unwanted slewing of the horizontal oscillator, which may cause bending of vertical lines as displayed on the kinescope.

SUMMARY OF THE INVENTION

A television horizontal oscillator AFPC includes a controllable oscillator having a rate control terminal and an output terminal at which oscillations are generated. A phase detector is coupled to a source of horizontal synchronizing signals and to the output terminal of the oscillator for generating an output signal representative of the frequency and phase difference between the synchronizing signals and the oscillations. A controllable filter is coupled to the output terminal of the phase detector and to the rate control terminal of the oscillator for closing a degenerative feedback loop and for filtering the output signal to form an oscillator control voltage by which the oscillator is synchronized with a synchronizing signal. The controllable filter further includes a controllable impedance by which the time constant of the filter is periodically changed. The controllable impedance when operated introduces a first voltage offset which perturbs the control voltage and therefore perturbs the synchronization. According to the invention, a second offset voltage having a magnitude equal to that of the first voltage offset is introduced for maintaining the control voltage constant, thereby reducing the perturbation of the synchronization.

DESCRIPTION OF THE DRAWING

FIG. 1 illustrates in block and schematic diagram form a television receiver incorporating the invention together with amplitude-time plots of various waveforms occurring in the arrangement during operation;

FIG. 2 is a schematic diagram illustrating equivalent voltages and resistances in the AFPC loop filter useful in explaining the invention; and FIG. 3 is a schematic diagram of a portion of an AFPC loop filter including an alternate embodiment of the invention.

DESCRIPTION OF THE INVENTION

FIG. 1 illustrates a portion of a television receiver adapted to receiving transmitted or broadcast signals and signals from an external video source. In FIG. 1, an antenna 10 is arranged to receive transmitted television signals modulated onto a carrier. A tuner, IF amplifier and video detector arrangement 12 is coupled to antenna 10 and is adapted to recovering video modulation from the transmitted signal. The video is made available at a terminal 14a of a selector switch 14. An external video jack 16 is coupled to terminal 14b of switch 14. Video selected by switch 14 is applied to an input of a synchronizing signal separator 18. Separator 18 separates horizontal synchronizing pulses illustrated as waveform 19 from the composite video and applies them to the base of a transistor 22, which forms one input of a phase detector designated generally as 20. Phase detector 20 includes emitter-coupled transistors 24 and 26, the emitters of which are coupled to the collector of transistor 22 by a resistor 28. The bases of transistors 24 and 26 receive a direct biasing voltage from a resistive voltage divider designated generally as 28 coupled between B+ and ground and including resistors 30 and 32. The bases of transistors 24 and 26 are coupled to the tap on voltage divider 28 by resistors 34 and 36, respectively. A current mirror designated generally as 38 has an input coupled to the collector of transistor 24 and an output coupled to the collector of transistor 26 and is used as a differential-to-single-ended converter for forming a high-impedance output terminal of phase comparator 20 at the collector of transistor 26. The output impedance is represented by a resistor 41.

The output of comparator 20 is coupled to the input of a filter 40 comprising a high-frequency rolloff capacitor 42 coupled between a filter input point 43 and ground. Filter 40 also includes a low-frequency averaging capacitor 44 having one end coupled to junction 43 and the other end coupled at a junction 45, with a resistor 46a forming a serial connection between junction 43 and ground. An impedance setting resistor 48 is coupled from junction 43 to a low-impedance input of a horizontal oscillator 50.

Horizontal oscillator 50 has its frequency and phase controlled by the input from filter 40, and produces horizontal-rate pulses which are applied to a horizontal deflection circuit illustrated as block 52, which tends to cause the flow of deflection current in a horizontal deflection winding 54 associated with a kinescope, not shown. The deflection voltage resulting from the flow of deflection current in deflection winding 54 is applied to an integrator designated generally as 56 coupled to winding 54. Integrator 56 forms a recurrent horizontal-rate sawtooth signal voltage illustrated as waveform 57 from the pulsatory deflection voltage and applies it to the base of transistor 26 of phase detector 20 through a coupling capacitor 58. Sawtooth signal 57 is compared with the horizontal synchronizing pulses in phase detector 20, which responds with current pulses representing the frequency and phase differences between sawtooth signal 57 and horizontal synchronizing pulses 19.

Synchronizing signal separator 18 also separates vertical synchronizing signals illustrated at 62 from the composite video selected by switch 14. The vertical synchronizing signals are applied to a vertical-frequency oscillator 60, which produces oscillations in synchronism with the vertical synchronizing pulses. Vertical-rate pulses from oscillator 60 are applied to an input of a vertical deflection amplifier 64, the output of which drives a vertical deflection winding 66 associated with the kinescope. A current sensing resistor 68 is coupled in series with winding 66 and couples a feedback voltage to an input of amplifier 64.

The voltage appearing at, and illustrated in conjunction with, the output A of amplifier 64 is applied to a monostable multivibrator (MVB) 70 by way of a differentiating and coupling circuit designated generally as 80. Multivibrator 70 is set to its unstable state by the lagging edge of the vertical retrace pulse and has a delay of approximately 14 milliseconds before lapsing once again into the stable state. Since the vertical scanning interval has a duration of approximately 16 milliseconds, multivibrator 70 produces a low output signal in its stable state for an interval of about 2 milliseconds preceding the end of the vertical retrace interval. The output of MVB 70 is coupled to a controllable switch designated generally as 90 including an NPN transistor 92, the emitter of which is connected to ground and the collector of which is connected by way of resistor 47 to junction point 45. During the stable state of multivibrator 70, which includes portions of the vertical retrace and blanking intervals, transistor 92 is nonconductive and resistor 47 does not parallel resistor 46a. Thus, the resistance in series with capacitor 44 of filter 40 is maximum, representing the high-speed condition of filter 40. In the high-speed condition of the loop near the vertical retrace interval, the loop can respond quickly to step changes in the input signal. Transistor 92 conducts during the major portion of the vertical scanning interval, paralleling resistor 46a with resistor 47, thereby reducing the resistance in series with capacitor 44 and decreasing the speed of response of filter 40 for best noise performance.

As so far described, the television arrangement is similar to that described in the aforementioned Fernsler patent. It should be noted that capacitor 44 is larger than capacitor 42, and the major portion of the current produced by phase detector 20 will flow through capacitor 44. In normal operation, there is a net pulsating current flow from phase detector 20 which may be of either polarity. That is, either transistor 24 and current mirror 38 or transistor 26 will conduct predominantly, causing a net current flow through the filter. A portion of the current flow through the filter passes through transistor 92. When mirror 38 conducts, current flow through the filter and transistor 92 is in the normal conducting direction of transistor 92, and the collector of the transistor will be at about two-tenths of a volt positive with respect to ground. When transistor 26 conducts through filter capacitor 44 and transistor 92, the collector-base junction of transistor 92 is forward-biased, and the base-emitter junction is also forward-biased by the multivibrator. The base of transistor 92 remains 1 Vbe positive with respect to ground so long as the current through transistor 26 and filter 40 remains small with respect to the bias currents supplied to transistor 92 from multivibrator 70. When transistor 92 is operated in its inverted mode an offset voltage across the collector to emitter terminals is generated which may be different from that generated when operating in its normal mode. In normal operation, it may be anticipated that the current produced by phase detector 20 will have equal amounts of each polarity, whereby the collector voltage of transistor 92 may alternate between two voltages having a nonzero average with respect to ground.

The average offset voltage at the collector of transistor 92 is divided by the voltage divider consisting of resistors 46a and 47, and the voltage so divided is filtered by capacitors 42 and 44 to produce an offset voltage. Thus, capacitors 42 and 44 charge towards the offset voltage produced by transistor 92 during the vertical scanning interval, and discharge towards zero during the interval in which transistor 92 is turned off. This produces a perturbing voltage offset at junction 43 which is applied to horizontal oscillator 50 and which may cause unwanted slewing of oscillator 50 and thereby result in bending of vertical lines displayed on the kinescope.

In accordance with the invention, resistor 46a is made a part of a resistive voltage divider designated generally as 46 and including a resistor 46b coupled between B+ and junction point 45. The values of resistors 46a and 46b are selected so that the Thevenized impedance of the voltage divider is the desired resistance in series with capacitor 44 in the high-speed condition. The voltage division ratio is selected so the tap voltage of divider 46 equals the average offset voltage produced at the collector of transistor 92. In FIG. 2, capacitor 44 is illustrated connected to circuit point 43. The end of capacitor 44 remote from circuit point 43 is coupled to circuit point 45. Circuit point 45 is connected by means of resistor 47 to a battery 292 representing the offset voltage. Circuit point 45 is connected by way of a resistor 246 to a terminal of a battery 293, the other terminal of which is connected to ground. Resistor 246 and battery 293 represent the Thevenized impedance and equivalent voltage source, respectively, of voltage divider 46.

No average current flows in resistors 47 or 246 so long as the voltages of batteries 292 and 293 are equal. Since the internal impedances of batteries 292 and 293 are zero, alternating currents flowing through capacitor 44 to ground during those intervals in which the branch containing resistor 47 is in the circuit see the parallel impedance of resistors 47 and 246. During those intervals in which transistor 92 is nonconductive, battery 292 may be considered as removed from the circuit of FIG. 2. In this condition, current flowing through capacitor 44 to ground sees the impedance of resistor 246 alone. However, the DC voltage at circuit point 45 does not change, because of the presence of battery 293. Thus, capacitor 44 and the other portions of the filter are not subject to a transient voltage caused by the switching of transistor 92, and the synchronization of oscillator 50 is not perturbed.

In FIG. 3, the offset voltage is negative in polarity and is generated by a voltage divider which is substituted for the impedance of resistor 47 rather than for resistor 46. In FIG. 3, circuit point 45 is coupled to ground by a resistor 346 having a high resistance suitable for causing filter 40 to have a high-speed response. The collector of transistor 92 is connected directly to circuit point 45. The emitter of transistor 92, rather than being coupled to ground, is coupled to a tap point on a voltage divider designated generally as 347. Divider 347 includes resistors 347a and 347b coupled between a negative voltage source B— and ground. The Thevenized impedance of divider 347 equals the desired resistance of resistor 47 for low-speed operation of filter 40. The tap point voltage of divider 347 is selected to be equal in magnitude and opposite in polarity to the offset voltage produced by transistor 92 whereby the voltage offset at junction 45 is eliminated.

In a particular embodiment of the invention, it is desired that the resistance in series with capacitor 44 be approximately 3900 ohms when transistor 92 is nonconductive, and it is desired that the resistance in series with capacitor 44 in the low-speed condition be approximately 350 ohms. Assuming that the average value of the offset voltage produced by the switching transistor is 0.1 volts and B+ is 10 volts, the following component values are calculated for FIG. 1:

Resistor 46a: 3980 ohms
Resistor 46b: 394 K do
Resistor 47: 390 do

Other embodiments of the invention will be apparent to those skilled in the art. For example, any low-impedance voltage source such as the collector of a saturated transistor may be coupled to the emitter of the switching transistor in place of voltage divider 347. A current source could take the place of resistor 46b, in which case the output impedance of the current source would be used in calculating the divider impedance. In principle, a current source could alternatively be used in place of resistor 46a, if the B+ value were suitable. Any kind of switching device producing an offset voltage either by an inherent offset or by asymmetric or nonlinear conduction (rectification) may be corrected.

What is claimed is:
1. A television horizontal oscillator phase control loop arrangement, comprising:
a source of horizontal synchronizing signals;
controllable oscillator means including a rate control input terminal and an output terminal at which oscillators are generated;
a phase detector coupled to said source of horizontal synchronizing signals and to said output terminal of said oscillator means for generating an output signal representative of the frequency and phase difference between said synchronizing signals and said oscillations; and
controllable filter means coupled to said output terminal of said phase detector and said rate control terminal of said oscillator means for closing a degenerative feedback AFPC loop for filtering said output signal to form an oscillator control voltage for synchronizing said oscillator with said synchronizing signals, said controllable filter means further comprising controllable impedance means by which the time constant of said filter is periodically changed, said controllable impedance means introducing during a portion of its operating time a first voltage offset which perturbs said control voltge and therefore said synchronization; wherein the improvement comprises:
means for introducing a second offset voltage of magnitude equal to that of said first voltage offset for maintaining said control voltage constant thereby reducing said perturbation.

2. An arrangement according to claim 1 wherein said controllable impedance means comprises:
a switch; and
coupling means for coupling said switch with the remainder of said controllable impedance means.

3. An arrangement according to claim 2 wherein said coupling means couples one end of said switch to a source of reference potential.

4. An arrangement according to claim 3 wherein said means for introducing a second offset voltage is coupled to the end of said switch remote from said source of reference potential.

5. An arrangement according to claim 1 wherein said means for introducing a second offset voltage comprises a voltage divider including a tap, and wherein said controllable impedance means comprises:
a switch; and
coupling means for coupling said switch to the remainder of said controllable impedance means.

6. An arrangement according to claim 5 wherein said coupling means couples one end of said switch to a point of reference potential; and
said tap is coupled to the end of said switch remote from said source of reference potential.

7. An arrangement according to claim 5 wherein said tap is coupled to said coupling means.

8. An improved switchable AFPC loop comprising:
controllable oscillator means for producing oscillator signals;
a source of synchronizing signals;
phase detection means coupled to said controllable oscillator means and to said source of synchronizing signals for generating a control signal representative of the frequency and phase difference between said oscillator signals and said sync signals;
switchable filter means coupled to said phase detection means and to said controllable oscillator means for filtering said control signal and closing a feedback loop for maintaining said oscillator signals in consonance with said sync signals, said switchable filter means further comprising:
filter capacitor means;
first resistance means serially coupled with said filter capacitor means for establishing the speed of said filter means;
switchable impedance means coupled with said resistance means for varying the speed of said filter means, said switchable impedance means producing during its conducting condition a first voltage offset which perturbs said control signal and said consonance;
wherein the improvement comprises second resistance means coupled with said first resistance means and with a source of potential for producing across said first resistance means a second offset voltage equal in magnitude to said first whereby said perturbation is reduced.

9. An improved switchable AFPC loop comprising:
controllable oscillator means for producing oscillator signals;
a source of synchronizing signals;
phase detector means coupled to said controllable oscillator means and to said source of synchronizing signals for generating a control signal representative of the frequency and phase difference between said oscillator signals and said sync signals;
switchable filter means coupled to said phase detection means and to said controllable oscillator means for filtering said control signal and closing a feedback loop for maintaining said oscillator signals in synchronism with said sync signals, said switchable filter means further comprising:
filter capacitor means;
first resistance means coupled with said filter capacitor means at a junction for establishing the speed of said filter means;
switch means coupled in parallel with said first resistance means for changing the impedance presented to said filter capacitor means, said switch producing a first offset voltage perturbing said synchronism, wherein the improvement comprises:
second resistance means coupled to said junction and to a source of voltage for producing a second offset voltage equal in magnitude to the average value of said first whereby said perturbation is reduced.

10. An improved switchable AFPC loop comprising:
controllable oscillator means for producing oscillator signals;
a source of synchronizing signals;
phase detector means coupled to said controllable oscillator means and to said source of synchronizing signals for generating a control signal representative of the frequency and phase difference between said oscillator signals and said sync signals;
switchable filter means coupled to said phase detection means and to said controllable oscillator means for filtering said control signal and closing a feedback loop for maintaining said oscillator signals in synchronism with said sync signals, said switchable filter means further comprising:
filter capacitor means;
first resistance means coupled with said filter capacitor means for establishing the speed of said filter means;
second resistance means;
switch means coupled in series with said second resistance means thereby forming a first series network, said first series network being coupled in parallel with said first resistance means for varying the impedance presented to said filter capacitor means under the control of said switch means, said switch means introducing a first error voltage as a result of conduction, said error voltage perturbing said feedback loop and thereby affecting said synchronism; wherein the improvement comprises:
third resistance means coupled to a source of voltage and to said second resistance means for producing an offset voltage equal in magnitude to said first for reducing said perturbation and improving said synchronism.

11. An improved switchable AFPC loop comprising:
controllable oscillator means for producing oscillator signals;
a source of synchronizing signals;
phase detection means coupled to said controllable oscillator means and to said source of synchronizing signals for generating a control signal representative of the frequency and phase difference between said oscillator signals and said sync signals;
switchable filter means coupled to said phase detection means and to said controllable oscillator means for filtering said control signal and closing a feedback loop for maintaining said oscillator signals in consonance with said sync signals, said switchable filter means further comprising:

filter capacitor means;

first resistance means coupled with said filter capacitor means for establishing the speed of said filter means;

switchable impedance means coupled with said resistance means for varying the speed of said filter means, said switchable impedance means producing during its conducting condition a first voltage offset which perturbs said control signal and said consonance; wherein the improvement comprises:

second resistance means coupled with said first resistance means and with a source of potential for producing across said first resistance means a second offset voltage equal in magnitude to said first whereby said perturbation is reduced.

12. An improved switchable AFPC loop comprising:

controllable oscillator means for producing oscillator signals;

a source of synchronizing signals;

phase detection means coupled to said controllable oscillator means and to said source of synchronizing signals for generating a control signal representative of the frequency and phase difference between said oscillator signals and said sync signals;

switchable filter means coupled to said phase detection means and to said controllable oscillator means for filtering said control signal and closing a feedback loop for maintaining said oscillator signals in consonance with said sync signals, said switchable filter means further comprising;

filter capacitor means;

first resistance means coupled with said filter capacitor means for establishing the speed of said filter means;

switchable impedance means coupled with said resistance means for varying the speed of said filter means, said switchable impedance means producing during its conducting condition a first voltage offset which perturbs said control signal and said consonance; wherein the improvement comprises:

a source of current coupled with said first resistance means for producing across said first resistance means a second offset voltage equal in magnitude to said first whereby said perturbation is reduced.

* * * * *